(12) United States Patent
Cole

(10) Patent No.: US 12,204,103 B2
(45) Date of Patent: *Jan. 21, 2025

(54) DISPLAY DEVICE AND SYSTEM

(71) Applicant: ENVISICS LTD, Milton Keynes (GB)

(72) Inventor: Alexander Cole, Milton Keynes (GB)

(73) Assignee: ENVISICS LTD, Milton Keynes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,028

(22) Filed: Apr. 12, 2022

(65) Prior Publication Data

US 2022/0236561 A1     Jul. 28, 2022

Related U.S. Application Data

(63) Continuation of application No. 17/186,752, filed on Feb. 26, 2021.

(30) Foreign Application Priority Data

Mar. 20, 2020 (GB) ..................................... 2004067

(51) Int. Cl.
    *G02B 27/01*       (2006.01)
    *G02B 3/00*        (2006.01)
    *G02B 27/00*       (2006.01)

(52) U.S. Cl.
    CPC .. *G02B 27/0103* (2013.01); *G02B 2027/0136* (2013.01)

(58) Field of Classification Search
    CPC .......... G09G 3/003; H04N 7/18; A61B 3/113; A61B 3/1225; A61B 3/103; G01S 11/12; G01S 1/02; G06T 19/00; G06T 19/006; A01B 9/001; G02B 27/144; G02B 27/0172; G02B 27/0149; G02B 27/0101;
(Continued)

(56) References Cited

U.S. PATENT DOCUMENTS

2006/0132914 A1*   6/2006   Weiss ..................... G02B 30/40
                                                       359/462
2009/0128902 A1   5/2009   Niv et al.
(Continued)

FOREIGN PATENT DOCUMENTS

| WO | 2018/154576 A1 | 8/2018 | |
|---|---|---|---|
| WO | WO-2019157987 A1 * | 8/2019 | ......... G02B 27/0101 |
| WO | WO-2019176438 A1 * | 9/2019 | ......... G02B 27/0172 |

*Primary Examiner* — Dawayne Pinkney
(74) *Attorney, Agent, or Firm* — McDonnell Boehnen Hulbert & Berghoff LLP

(57) ABSTRACT

A display device having a viewing window on a viewing plane is described. The display device comprises a picture generating unit, a first waveguide pupil expander and a second waveguide pupil expander. The picture generating unit is arranged to display a picture on a display plane. The picture is a holographic reconstruction formed from a hologram of the picture. The first waveguide pupil expander comprises an input port arranged to receive light of the picture and to expand a first exit pupil thereof in a first dimension. The second waveguide pupil expander comprises an input port arranged to receive light of the picture and to expand a second exit pupil thereof in the first dimension. The first dimension corresponds to a dimension of the viewing window. A method of expanding a viewing window of a display device is also described.

11 Claims, 13 Drawing Sheets

(58) Field of Classification Search
CPC .............. G02B 27/145; G02B 27/1013; G02B 27/0103; G02B 5/18; B60R 1/00
USPC ............ 359/629–636, 13–14, 566, 569, 618; 345/7–9, 632–633, 207; 349/11
See application file for complete search history.

(56) References Cited

U.S. PATENT DOCUMENTS

| | | | |
|---|---|---|---|
| 2011/0096401 A1* | 4/2011 | Levola | G02B 27/0172 359/573 |
| 2012/0224062 A1 | 9/2012 | Lacoste et al. | |
| 2017/0235144 A1* | 8/2017 | Piskunov | G02B 5/18 359/13 |
| 2020/0166754 A1* | 5/2020 | Leister | G02B 5/1828 |
| 2021/0026140 A1* | 1/2021 | Kasegawa | G02B 27/0172 |

* cited by examiner

FIGURE 5 – PRIOR ART

DISPLAY DEVICE AND SYSTEM

CROSS REFERENCE TO RELATED APPLICATIONS

The present application is a continuation of U.S. patent application Ser. No. 17/186,752, filed Feb. 26, 2021, which claims the benefit of priority of United Kingdom Patent Application no. 2004067.1, filed Mar. 20, 2020. The entire disclosure contents of these applications are herewith incorporated by reference into the present application in their entirety.

FIELD

The present disclosure relates to a projector. More specifically, the present disclosure relates to a holographic display device, a method of holographic projection and holographic projection system. Some embodiments relate to a head-up display. Some embodiments relate to an improved pupil expander and method for forming a viewing window of a display device.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic display device, such as a holographic projector, may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is disclosed herein a display device having a viewing window. The viewing window is disposed on a viewing plane. The display device comprises a picture generating unit, a first waveguide pupil expander and a second waveguide pupil expander. The picture generating unit is arranged to display a picture (or image) on a display plane. The picture is a holographic reconstruction formed from a hologram of the picture (or image). The first waveguide pupil expander comprises a first input port. The first input port is arranged to receive light of the picture (or image). The first waveguide pupil expander is arranged to expand a first exit pupil thereof in a first dimension. The second waveguide pupil expander comprises a second input port. The second input port is arranged to receive light of the picture. The second waveguide pupil expander is arranged to expand a second exit pupil thereof in the first dimension. The first dimension corresponds to a dimension of the viewing window.

There is disclosed herein a display device having a viewing window. The viewing window is disposed on a viewing plane. The display device comprises a picture generating unit, a first waveguide pupil expander and a second waveguide pupil expander. The picture generating unit is arranged to display a picture (or image) on a display plane. The picture is a holographic reconstruction formed from a hologram of the picture (or image). The first waveguide pupil expander comprises a first input port. The first input port is arranged to receive light of the picture (or image). The first waveguide pupil expander is arranged to replicate the received light of the picture (or image) in order to form a first (expanded) exit pupil of the first waveguide expander (e.g. expand the viewing window in a first sub-area of the viewing plane). The second waveguide pupil expander comprises a second input port. The second input port is also arranged to receive light of the picture (or image). The second waveguide pupil expander is arranged to replicate the received light of the picture (or image) in order to form a second (expanded) exit pupil of the second waveguide pupil expander (e.g. expand the viewing window in a second sub-area of the viewing plane). The first (expanded) exit pupil/sub-area may correspond to one of the left and right eyes of the viewer at the viewing plane and the second (expanded) exit pupil/sub-area may correspond to the other of the left and right eyes of the viewer at the viewing plane.

In a display device having a viewing window on a viewing plane, a waveguide pupil expander is arranged to expand the exit pupil/viewing window in a first dimension by a series of internal reflections along the length of the waveguide. In particular, the waveguide receives input light from a picture generating unit at one end thereof and, by a series of internal reflections from opposed surfaces thereof, forms a plurality of replicas along its length by partial transmission of the received light from one of the opposed surfaces. The input light should enter the waveguide at an angle that gives rise to the series of internal reflections. For example, in order to form a plurality of generally evenly spaced replicas with rays that are parallel to each other, the light should be incident on, and reflect from, each opposed surface at the substantially the same angle (i.e. each "bounce" of the light rays should be at substantially the same angle). This may be achieved by orientating the waveguide in a second dimension orthogonal to the first dimension, the second dimension parallel to the direction of propagation of the light of the replicas. Thus, the waveguide is orientated at an angle (e.g. of less than 90°) relative to the viewing plane and so occupies a "height" in the second dimension, as described in more detail below. As a result of this angled orientation, the waveguide consumes a volume within the display device that is significantly larger than the volume of the waveguide itself.

The first and second waveguide pupil expanders form a pupil expander arranged to expand the viewing window of the display device in the first dimension. In embodiments, each of the first and second waveguide pupil expanders comprises a pair of parallel reflective surfaces arranged to guide received light from an input port to an exit pupil by a series of internal reflections. A first reflective surface of the pair of parallel reflective surfaces is partially transmissive and partially reflective of the received light, and a second reflective surface of the pair of parallel reflective surfaces is fully reflective of the received light.

The first exit pupil of the first waveguide pupil expander is formed at the first reflective surface thereof, and the second exit pupil of the second waveguide pupil expander is formed at the second reflective surface thereof. It may be said that the first reflective surface of each of the first and second waveguide pupil expanders acts to expand the exit pupil/viewing window by transmitting a plurality of replicas along its length (corresponding to the first direction).

In embodiments, the first input port of the first waveguide pupil expander is arranged to receive an input beam, comprising light of the picture, from the picture generating unit, and the second input port of the second waveguide pupil expander is arranged to receive an input beam, comprising light of the picture, from the picture generating unit.

In embodiments, the output light of the replicas may be in the same direction (i.e. along the same optical/projection axis) as the input light. Thus, the optical/projection axis of the input and output light is orthogonal to the first dimension of the viewing plane.

In embodiments, the first waveguide pupil expander is arranged at a first angle less than 90° with respect to the first dimension/viewing window/input beam. The second waveguide pupil expander is arranged at a second angle less than 90° with respect to the first dimension/viewing window/input beam. The angled orientation of each of the first and second waveguide pupil expanders advantageously provides substantially uniform pupil expansion, by the formation of evenly spaced replicas along the length thereof, whilst minimising the overall volume occupied by the pupil expander of the display device.

Each of the first and second waveguide pupil expanders replicates the received light of the picture (or image) in order to expand the exit pupil thereof. In particular, each of the first and second waveguide pupil expanders forms a plurality of replicas of the received light of the picture (or image). Each waveguide pupil expander may form n replicas of the received light of the picture (or image). The total number of replicas formed by the first and second waveguide pupil expander, collectively, is therefore 2n. The length of each first/second waveguide pupil expander is half the length of a single waveguide pupil expander arranged to form 2n replicas of the exit pupil by itself. By using first and second waveguide pupil expanders of shorter length (e.g. arranged in an appropriate composite configuration, each with an appropriate angled orientation) the size of the composite waveguide pupil expander structure in the second dimension (e.g. height or light propagation direction) may be reduced, and thus the volume required thereby. In some embodiments, the first waveguide pupil expander is configured to provide a first exit pupil for a first eye of a viewer (disposed on the viewing plane) and the second waveguide pupil expander is configured to provide a second exit pupil for a second eye of the viewer.

In some embodiments, the first waveguide pupil expander and second waveguide pupil expander are arranged in a symmetrical configuration. For example, respective end surfaces of the first waveguide pupil expander and the second waveguide pupil expander may be abutted to form a V-shaped configuration. The first input port may be adjacent the second input port. Thus, the first input port and the second input port may receive a common input beam from the picture generating unit. The first waveguide pupil expander may be arranged to replicate the received light of the picture in order to expand the first exit pupil of the first waveguide pupil expander in a first direction. The second waveguide pupil expander may be arranged to replicate the received light of the picture in order to expand the second exit pupil of the second waveguide pupil expander in a second direction. The first direction may be opposite to the second direction.

In some embodiments, the first direction and second direction are parallel to the viewing plane. It may be said that the viewing plane comprises the first direction and second direction. The viewing window is an area within which a viewer may view the picture (or image) at the viewing plane. Accordingly, the first exit pupil and the second exit pupil are expanded in the respective first and second directions along a first dimension of the viewing plane.

In other embodiments, the first and second waveguide pupil expanders are arranged in a different configuration, which may be symmetrical or asymmetrical. For example, the first and second waveguide pupil expanders may be spatially separated and/or spatially offset. In this case, the input ports of the first and second waveguide pupil expanders are also spatially separated, and separate input light beams from picture generating unit may be directed thereto by appropriate optical components, such as a beam splitter.

In embodiments, each waveguide pupil expander comprises a pair of parallel reflective surfaces. Each waveguide pupil expander is arranged to guide the received light of the picture (or image) from the input port to the exit pupil by a series of internal reflections. A first reflective surface of the pair of parallel reflective surfaces is partially transmissive and partially reflective of the received light and a second reflective surface of the pair of parallel reflective surfaces is fully reflective of the received light. The reflectivity of the second reflective surface may be graded along the length of the waveguide pupil expander.

In some embodiments, the reflectivity of the first reflective surface of at least one of the first and second waveguide pupil expanders is graded along the length thereof. For example, the reflectivity of the first or second waveguide pupil expander may be graded so that the first reflective surface outputs each replica with substantially the same intensity.

In some embodiments, each wavelength pupil expander may comprise a slab waveguide. The slab waveguide may be formed of an optically transparent solid material comprising a pair of parallel surfaces. In particular, a first surface may have a first fully reflective coating and a second surface, opposite to the first surface, may have a second partially reflective/partially transmissive coating. In other embodiments, each pupil expander comprises a pair of opposed mirrors spatially separated by an air gap. One mirror of the pair of mirrors is fully reflective and the other mirror of the pair of mirrors is partially reflective/partially transmissive.

In some embodiments, the first waveguide pupil expander and second waveguide pupil expander are adjoined such that the first input surface of the first waveguide pupil expander and second input surface of the second waveguide pupil expander form a continuous surface that faces the display plane.

Each of the first and second waveguides may be configured with first and second end surfaces at one end thereof, wherein the first end surface comprises the respective input port. The input port provides an optically transparent aperture in the first end surface for light to enter the waveguide. The first waveguide pupil expander and second waveguide pupil expander may be arranged in a configuration having abutting second end surfaces. In particular, a second end surface of the first waveguide pupil expander may be abutted against a second end surface of the second waveguide pupil expander.

In some embodiments, the display plane may comprise a display screen such as a diffuse screen.

In embodiments, each waveguide pupil expander comprises two reflective surfaces. One reflective surface—e.g. the first reflective surface—is partially transmissive and partially reflective. The partial transmissivity leads to the formation of replicas of the light rays received by the waveguide. The other reflective surface—e.g. the second reflective surface—of the waveguide is a perfect or near-perfect reflector—e.g. a mirror. Light is received at an input port of the waveguide. The waveguide may be substantially slab-shaped, wherein the separation of the two reflective surfaces is less than the dimensions of the two reflective surfaces. A light transmissive material between the two reflective surfaces may be air or a transparent solid material such as glass. Each reflective surface is substantially planar. The waveguide is configured such that the viewer should look at the large surface of one of the reflective surfaces—e.g. the partially reflective surface. This surface may be referred to as the viewing surface. The input port may be on the same side of the slab as the viewer or it may be on the opposite side. The input port may comprise a break or gap in the reflective component—e.g. reflective layer or coating—of the fully reflective surface or the partially reflective surface. The input port may alternatively begin at the end of the reflective component.

The viewing window may be an eye-box or an eye-motion-box. The waveguide enlarges the viewing window due to the generation of extra rays by division of amplitude of the incident wavefront. In accordance with this disclosure, the incident light (that is, the light received by the waveguide) is spatially-modulated light. The spatially-modulated light may be encoded with a hologram of the picture or encoded with the picture itself. In either case, the incident light may be collimated.

The waveguide replicates the rays of the incident wavefront in order to expand the viewing window/pupil. Each successive replica is formed by one more bounce of the light rays within the waveguide. In some embodiments, the reflectivity/transmissivity of the first reflective surface/viewing surface is graded—that is, changes with distance—in order to compensate for the decrease in light intensity along the waveguide owing to partial escape of the light at each bounce. The reflectivity of the graded coating therefore decreases with distance from the input port.

In some embodiments, the light of the picture (or image) comprises spatially-modulated light that is formed on an intermediate plane between the picture generating unit and first and second waveguide expanders/viewing window. The picture formed at the intermediate plane may be formed in free-space or may be formed on a screen such as a diffuser. In these embodiments, the amplitude of the light is spatially-modulated in accordance with the displayed picture. The picture may be formed on the intermediate plane or screen by holographic projection. That is, a spatial light modulator may display a hologram that is illuminated and forms a picture on the intermediate plane or screen (e.g. diffuser). In embodiments in which the picture (i.e. holographic reconstruction) is formed on a screen, it may be preferred to consider the screen to be part of the picture generating unit. In this case, it may be said that the screen is disposed between the hologram plane and the viewing plane. It may be said that the screen forms a display plane of the picture generating unit.

In other embodiments, the light of the picture (or image) comprises spatially-modulated light that is encoded with a hologram. In these embodiments, a hologram is displayed by a spatial light modulator and light spatially-modulated in accordance with the hologram pattern may be used to reconstruct the picture (or image). It is sometimes said that, in this configuration, the lens of the viewer's eye performs the hologram-to-image (e.g. frequency domain to spatial domain) transformation. The holographic reconstruction may therefore be formed on the viewer's retina. Alternatively, or additionally, the holographic reconstruction may be formed in free space between the hologram plane and viewing plane. In these other embodiments, a lens may be included between the display/hologram and viewer in order to relay the holographic reconstruction. The hologram may be a Fourier hologram. Embodiments in which the viewer looks directly at the hologram (e.g. spatial light modulator displaying the hologram) may be referred to as direct view. Direct view embodiments are characterised by the absence of a screen (e.g. diffuser) between the viewer and hologram. Direct view embodiments may be advantageous because the problems associated with using a screen/diffuser are not encountered.

There is further provided a method of expanding a viewing window on a viewing plane of a display device. The method displays a picture (or image) on a display plane. The picture is a holographic reconstruction formed from a hologram of the picture (or image). The method receives light of the picture (or image) at an input port by a first waveguide expander. The method expands, by the first waveguide pupil expander, a first exit pupil thereof in a first dimension. The method further receives light of the picture (or image) an input port of a second waveguide expander. The method expands, by the second waveguide pupil expander, a second exit pupil thereof in the first dimension. The first dimension corresponds to a dimension of the viewing window. For example, the first dimension may correspond to a width of the viewing window.

In some embodiments, the method may expand the first exit pupil in a first sub-area of the viewing window corresponding to a first eye of a viewer (at the viewing plane) and the method may expand the second exit pupil in a second sub-area of the viewing window corresponding to a second eye of the viewer.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or such like—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
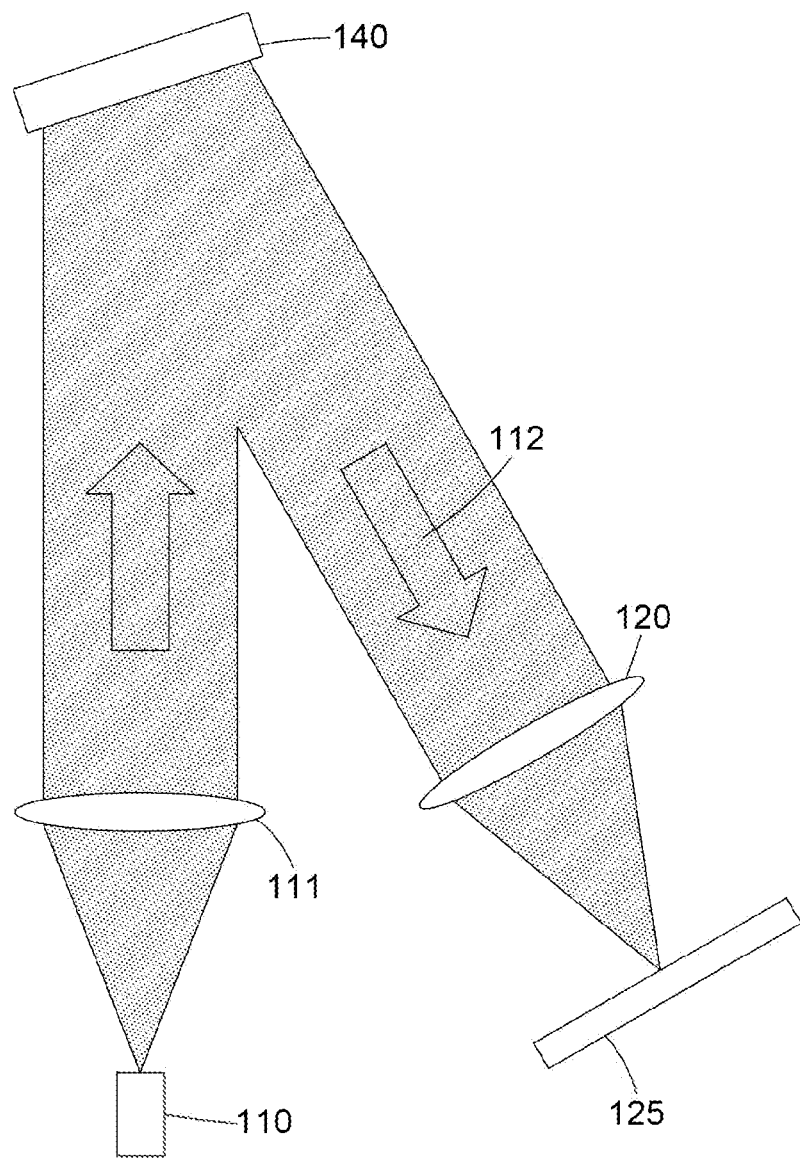
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
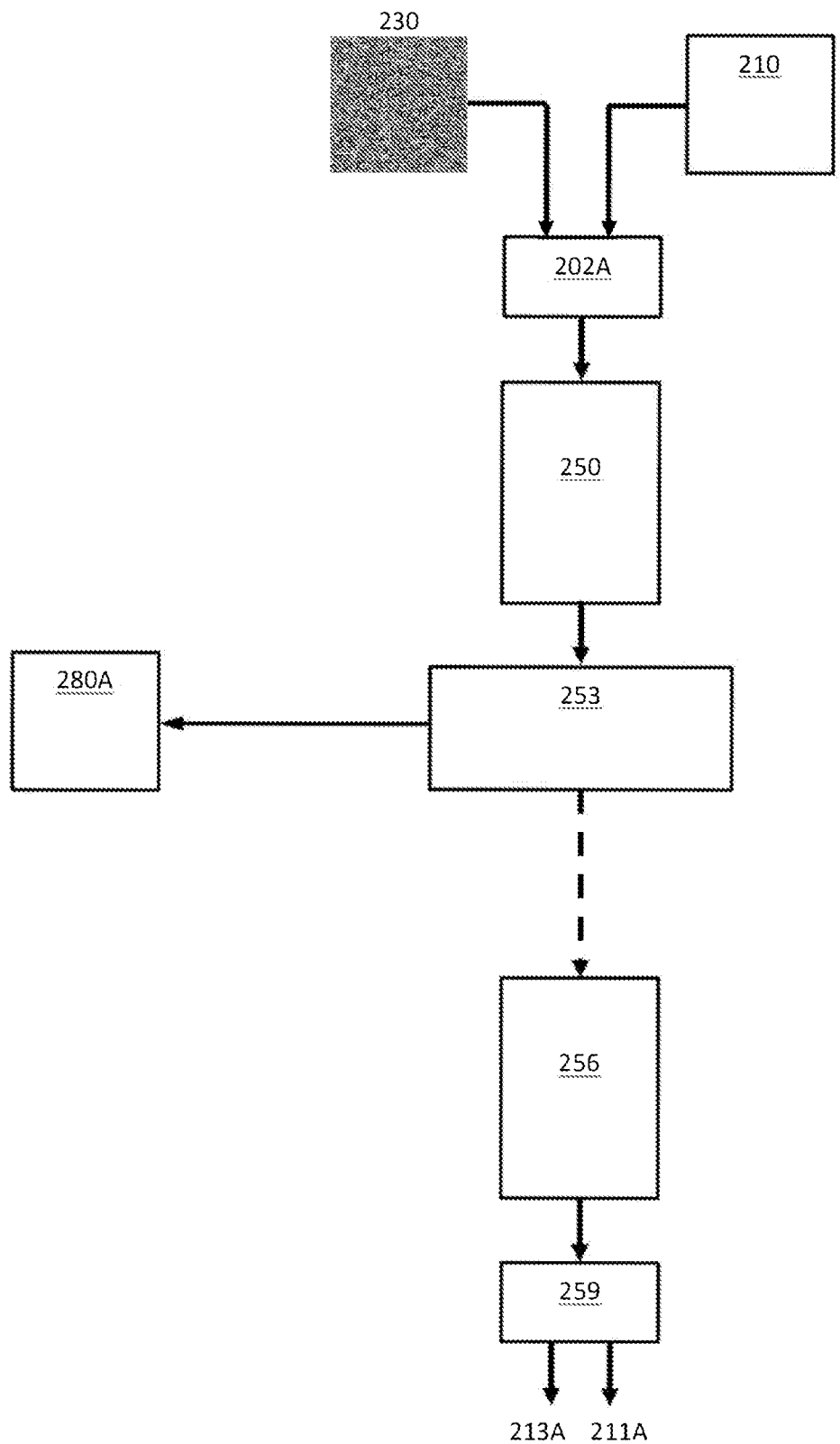
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
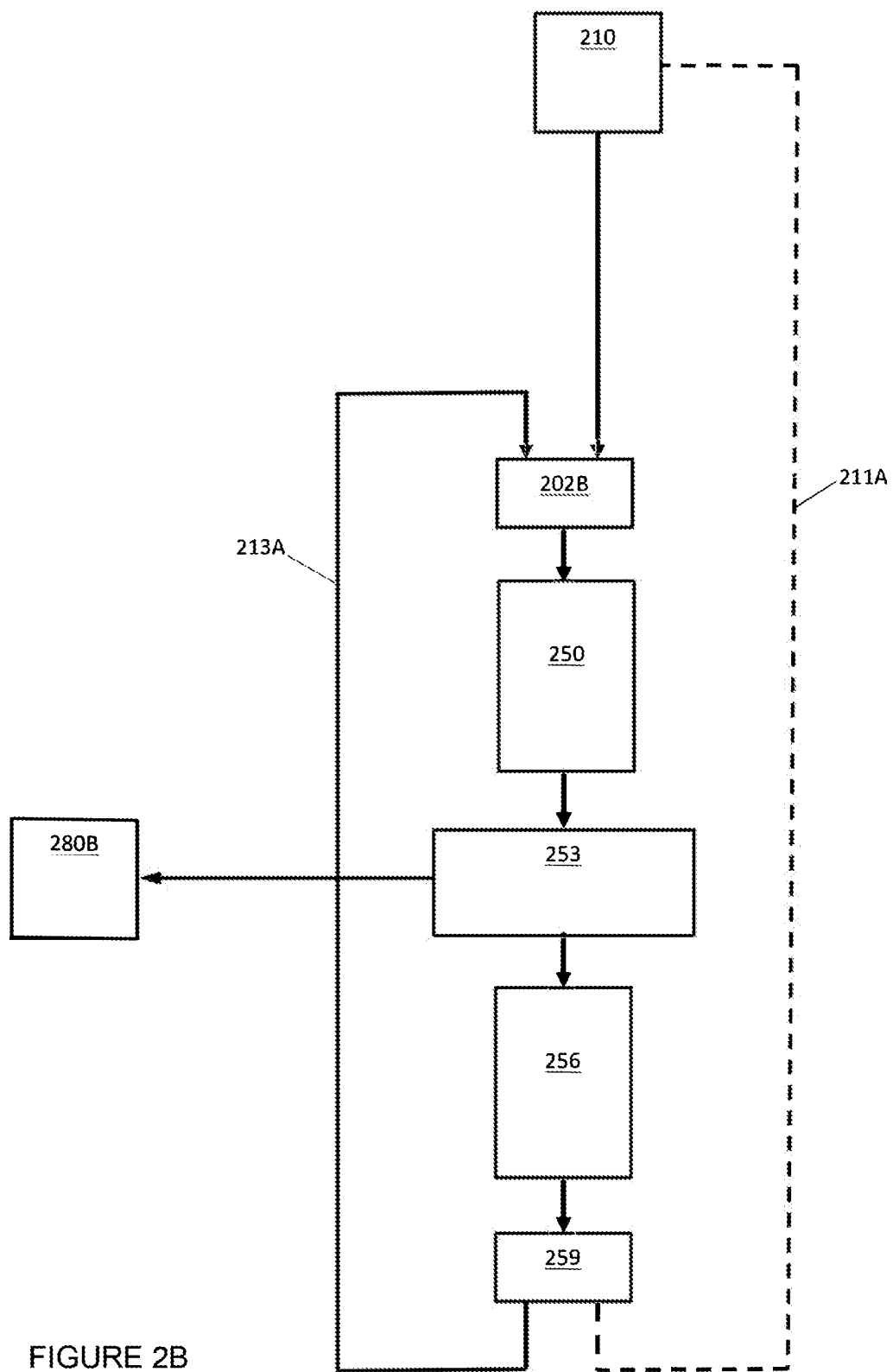
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
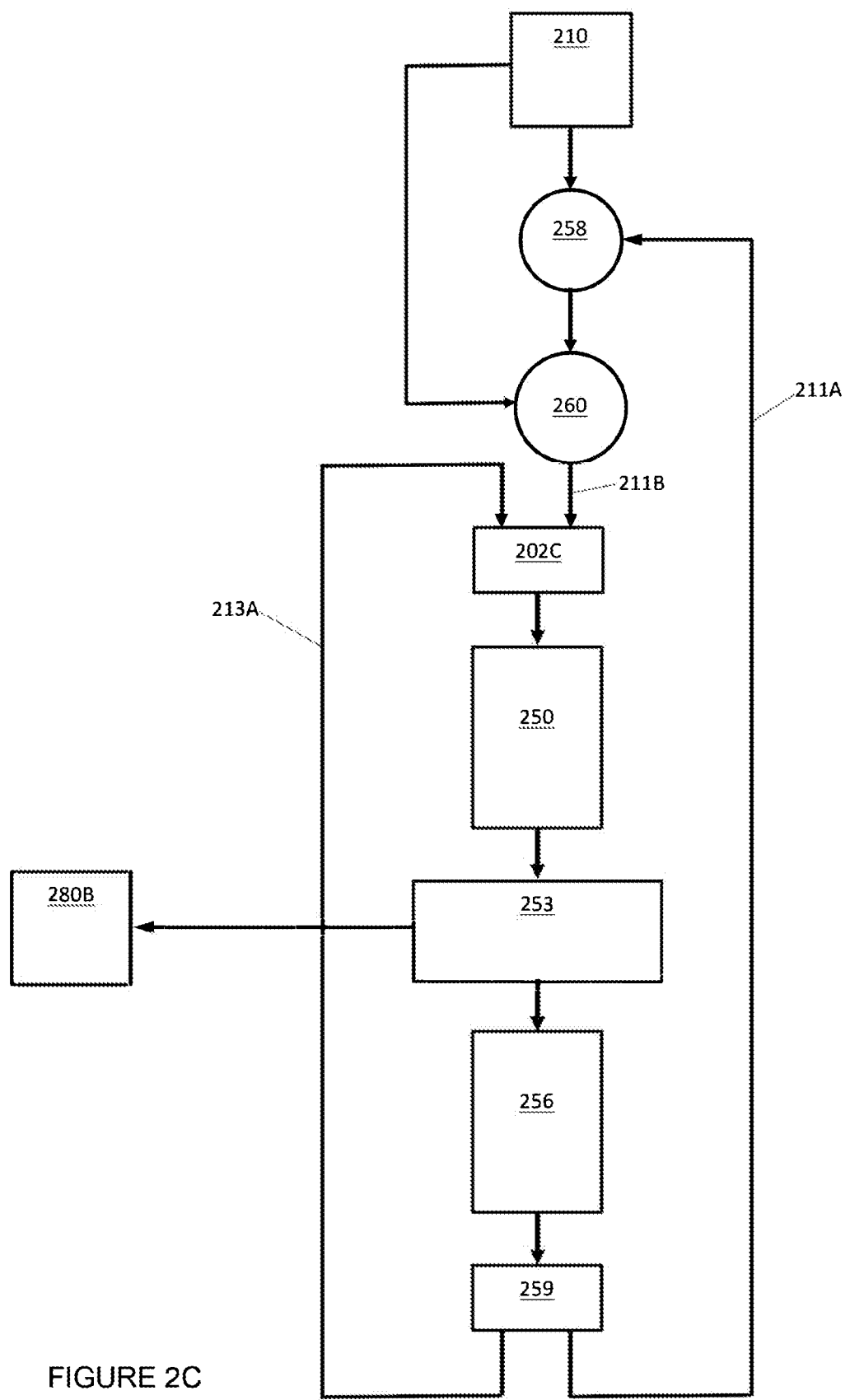
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i\angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
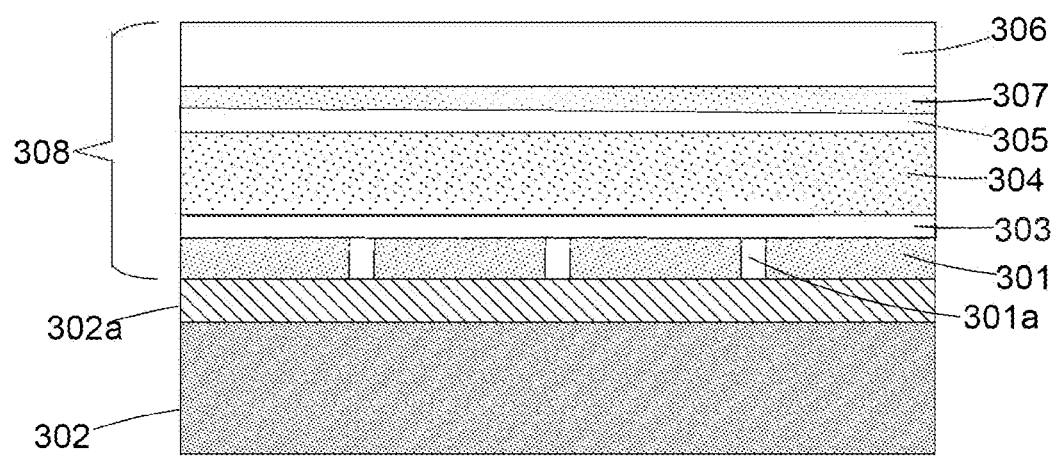
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Waveguide Pupil/Viewing Window Expander

In holographic projection systems such as head-up displays (HUDs) it is desirable to expand the exit pupil corresponding to the eye box region or viewing window of the HUD. In particular, the viewer needs to be able to move his or her head around and be able to see the complete image from any position within a limited area at the eye box/viewing distance. This is known as the eye motion box (EMB) or viewing window. Thus, a pupil expander may be employed to enlarge the EMB or viewing window. Typically, the pupil expander enlarges the EMB by generating extra rays by division of the amplitude of the incident wavefront.

Figure 4:
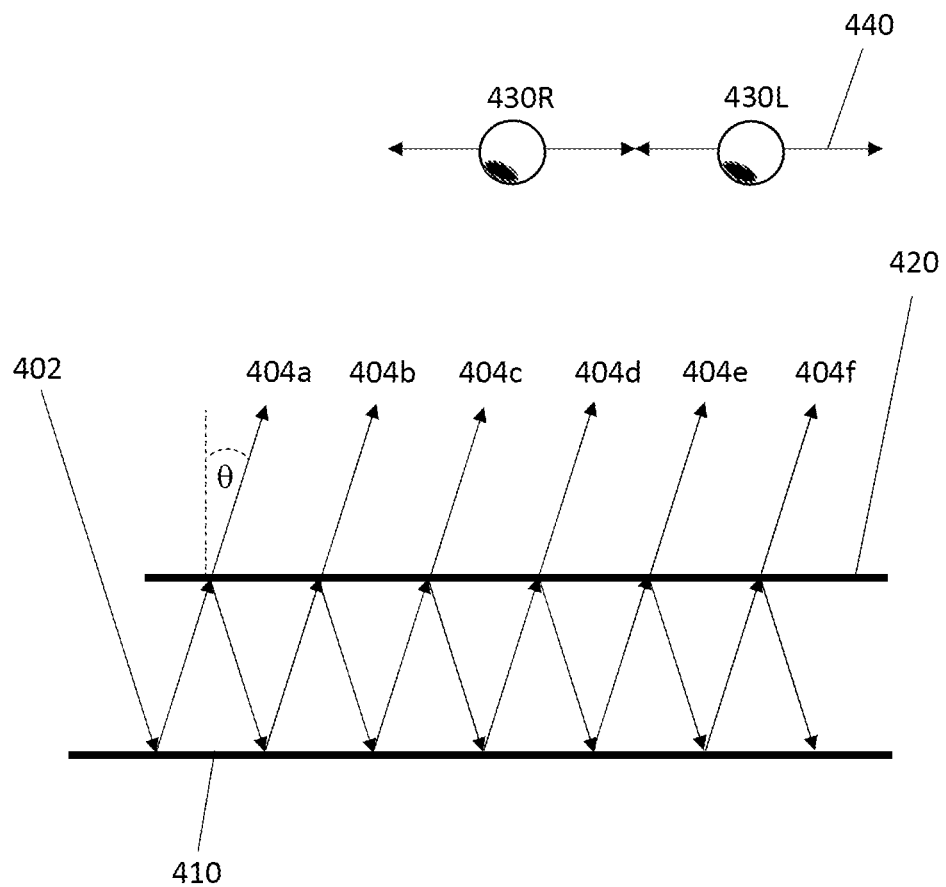
FIG. 4 is a schematic of an example pupil expander comprising a waveguide formed by a pair of mirrors.

FIG. 4 schematically illustrates an example pupil expander comprising a waveguide formed by a pair of mirrors. The general principle of a waveguide is known in the art and not described in detail herein. A waveguide guides light within a layer between a pair of parallel reflective surfaces by internal reflection. A pupil expander is formed from a waveguide comprising a first partially reflective surface (e.g. a partially reflective mirror having varying reflectivity with distance) and a second fully reflective surface (e.g. a mirror having substantially 100% reflectivity). The first reflective surface is opposite (i.e. faces) the second reflective surface. In the waveguide of FIG. 4, first partially reflective mirror 420 comprises a reflective coating the reflectivity of which decreases along the length of the waveguide, and second fully reflective mirror 410 comprises a reflective coating having substantially full reflectivity. The first and second mirrors are spatially-separated to form an air gap within which light propagates by internal reflection.

As shown in FIG. 4, an input light beam 402 (which may comprise light of a picture/image or spatially modulated light encoded with a hologram as described below) comprising input light rays enters the waveguide through an opening between first and second mirrors 410,420 at one end thereof. The waveguide is arranged to guide the received light along its length to a viewing window. The viewing window is an area or volume within which a viewer may view an image as described herein. The input light beam 402 is bounced along the waveguide due to internal reflections by first partially reflective mirror 420 and second fully reflective mirror 410. Example rays are illustrated in FIG. 4.

Due to the partial reflectivity of first mirror 420, a proportion of light is transmitted by first mirror 420 to provide a plurality of output light rays 404a-f (herein called "replicas" because they replicate the input light rays) along the length of the waveguide. For ease of illustration, refraction of the output light rays 404a-f at the waveguide-air interface is not illustrated in FIG. 4. The replicas are evenly spaced along the length of the waveguide, since the light rays are incident on, and reflect from, the respective first and second mirrors 420, 410 at substantially the same angle at each bounce. It may be said that replicas are output uniformly along the length of the waveguide. Thus, first reflective surface 420 forms a viewing surface. It is said that the pupil (or viewing window) is expanded by the replicas formed by the waveguide. In particular, by forming a plurality of replicas 404a-f along the length of the waveguide, the viewing window is increased in size. Since the replicas are evenly spaced, it may be said that the waveguide uniformly expands the exit pupil (or viewing window). Each replica 404a-f corresponds to a proportion of the amplitude (intensity or brightness) of the input light beam 402. It is desirable that the grading provides a decrease in reflectivity (or conversely an increase in transmissivity) of the first reflective surface 420 along the length of the waveguide such that each replica 404a-f has substantially the same amplitude or intensity. Thus, a viewer's eyes 430L and 430R located within an eye box (i.e. pupil or viewing window) at a viewing distance from the first mirror 420 are able to see the image at any position within an expanded viewing window and with substantially the same brightness, as illustrated by arrows 440 denoting the viewing range.

The waveguide shown in FIG. 4 expands the viewing window in one dimension (illustrated as the x-axis/direction)—corresponding to the lengthwise direction along which the light beam propagates within the waveguide or the width of the viewing window from the perspective of the viewer—as shown by arrows 440. As the skilled person will appreciate, it is possible to expand the viewing window in two dimensions, when required, by using two orthogonal waveguides. This leads to a viewing range in two dimensions—i.e. a viewing plane located at the viewing distance from the waveguide.

Figure 5:
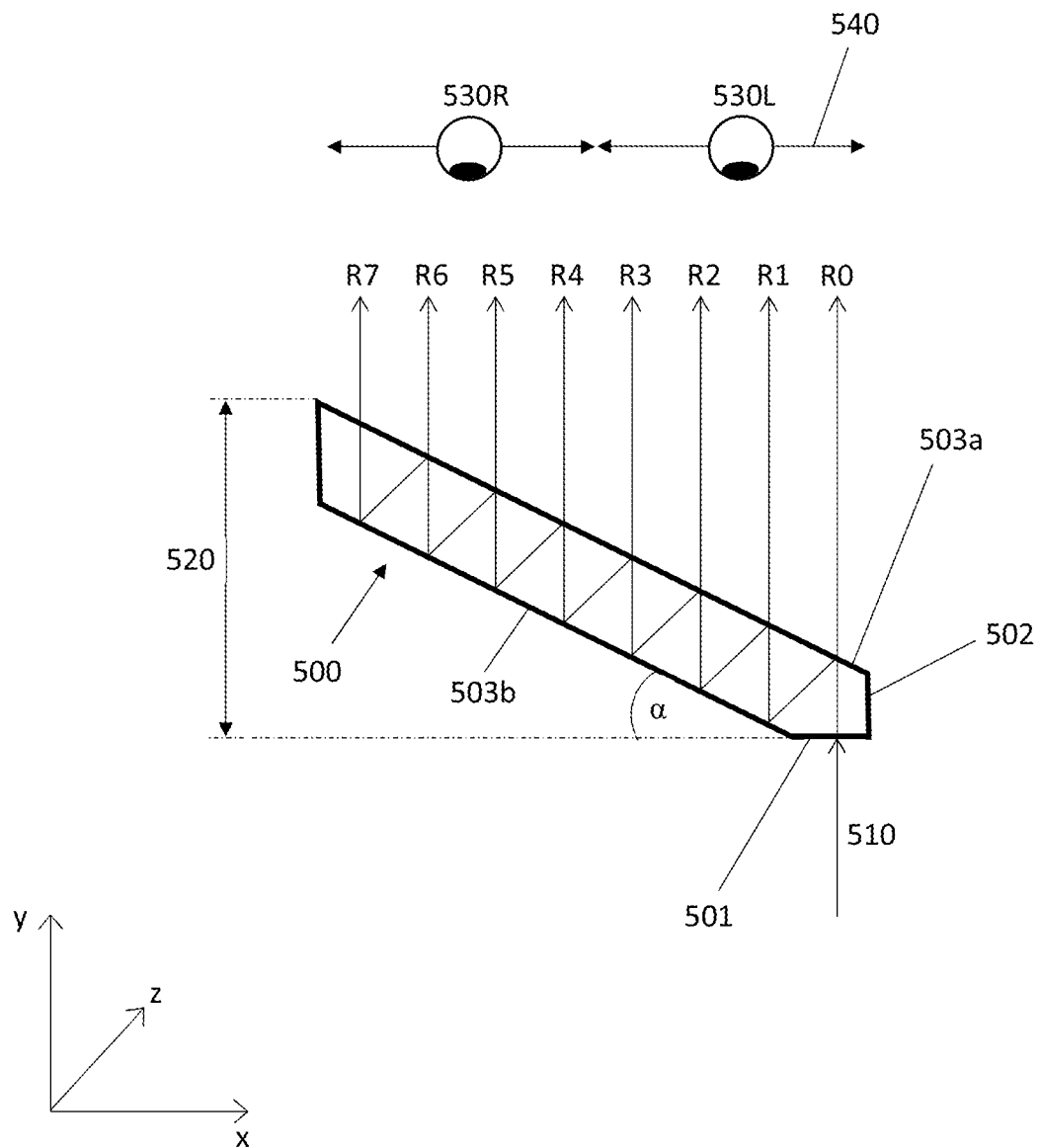
FIG. 5 shows an example pupil expander comprising a slab waveguide formed by a slab of glass having reflective opposed major surfaces.

FIG. 5 shows an example pupil expander comprising a waveguide 500 arranged in a known configuration. The pupil expander of FIG. 5 is used a comparative example to embodiments described below with reference to FIG. 9. In contrast to the waveguide of FIG. 4, the waveguide 500 comprises a block of optically transparent solid material. Such a waveguide is sometimes known as a "slab waveguide". Thus, the layer within which light propagates by internal reflection in the waveguide 500 of FIG. 5 is a transparent solid material. For example, the layer may be glass or Perspex. The waveguide may therefore be a glass or Perspex block or slab. Waveguide 500 comprises first and second reflective surfaces 503a, 503b formed by a pair of parallel opposed (facing) side surfaces of the slab or block, coated with reflective coatings. The first reflective surface 503a of the waveguide 500 may be coated with a coating comprising a large number of thin films (e.g. 25 or more thin films) in order to provide the necessary graded partial reflectivity. In particular, as described above, such thin films or similar coatings may provide decreasing reflectivity, and thus increasing transmissivity, with propagation distance such that the brightness (ray intensity) of each replica R0 to R7 is substantially constant. The amplitude of the propagating light beam reduces with propagation distance along the length of the waveguide 500 due to output of the replicas R0 to R7 and losses due to internal reflection. Thus, the grading of the first reflective surface 503a is designed to take into account the drop in intensity of the propagating light beam with propagation distance, whilst ensuring that each replica R0 to R7 has substantially the same intensity so that the image seen has uniform brightness throughout the viewing window (i.e. at all viewing positions). The second reflective surface 503b may be coated with a fully reflective coating or may be highly polished or otherwise treated to provide 100% reflectivity.

An input light beam 510 (which may comprise light of a picture/image or spatially modulated light encoded with a hologram as described below) comprising input light rays enters the waveguide 500 through input surface 501 which forms an input port. In the illustrated arrangement, the input surface 501 is provided on one or a pair of side surfaces 501, 502 formed adjacent one end of waveguide 500. The input port comprises an optically transparent aperture for the input beam 510. The waveguide 500 is arranged to guide light received from the input port to a viewing window. In the illustrated arrangement, the input light beam 510 is incident on first partially reflective surface 503a, which (partially) transmits light rays of a first replica R0. The light rays reflected by first partially reflective surface 503a propagate along the length of the waveguide 500 due to internal reflection by first partially reflective surface 503a and second fully reflective surface 503b. Example rays are illustrated in FIG. 5.

As in the example pupil expander of FIG. 4, a plurality of replicas R0 to R7 are transmitted by first partially reflective surface 503a along the length of the waveguide 500 so as to expand the exit pupil or viewing window in one dimension (illustrated as the x-axis). For ease of illustration, refraction of the output light rays of replicas R0 to F7 at the waveguide-air interface is not illustrated in FIG. 5. The replicas are evenly spaced along the length of the waveguide, since the light rays are incident on, and reflect from, the respective first and second reflective surfaces 503a, 503b at substantially the same angle at each bounce. To achieve this, waveguide 500 is orientated at an angle relative to the plane of the viewing window and light rays of replicas R0 to R7 are transmitted substantially parallel to each other. Thus, the waveguide pupil expander 500 has an overall height 520 in a second dimension (illustrated as the y-axis/direction), corresponding to the direction of light rays of replicas R0 to R7. In the illustrated example, the first partially reflective surface 503a comprises a graded coating, as described above, so that each replica R0 to R7 has substantially the same amplitude/intensity. Thus, when a viewer's eyes 530L and 530R are located within an eye box (i.e. pupil or viewing window) at a viewing distance, the viewer is able to see the image at any position within an expanded viewing window, as illustrated by arrows 540 denoting the viewing range. In the illustrated arrangement, the viewing window is at a fixed position in the y-direction, on an (x, z) viewing plane.

As shown in FIG. 5, the waveguide 500 is orientated along its length at an acute angle α relative to the viewing plane. In the illustrated arrangement, the input beam 510 and the light rays of replicas R0 to R7 propagate along an optical axis in the second dimension (illustrated as the y-axis/direction), which is orthogonal to the viewing plane. Thus, it also may be said that the waveguide 500 is orientated along its length at an acute angle (90°−α) relative to the second dimension/direction of input beam 510 and/or replicas R0 to R7. The length of waveguide 500 is chosen according to the required amount of expansion of the viewing window in the first direction (e.g. to form a defined number of replicas). As the skilled person will appreciate, the length and orientation (angle) of the waveguide 500 are determined according to application requirements, such as the size of the eye-box, the size of the picture (or image) and the like. Thus, the angled orientation of waveguide 500 leads to an increased height 520 of the pupil expander in the second dimension (the direction of propagation of replicas R0 to R7—illustrated as the y-direction), and thus increases the total volume required to accommodate the waveguide 500 in an imaging system. Thus, the package height is relatively bulky.

Example implementations of the present disclosure comprise holographic display devices and methods that use a pupil expander comprising a pair of waveguides. The waveguides may be configured to reduce the effective height of the pupil expander. This may result in a less bulky imaging system.

First Embodiments—Indirect View Holographic Display Device

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

Figure 6:
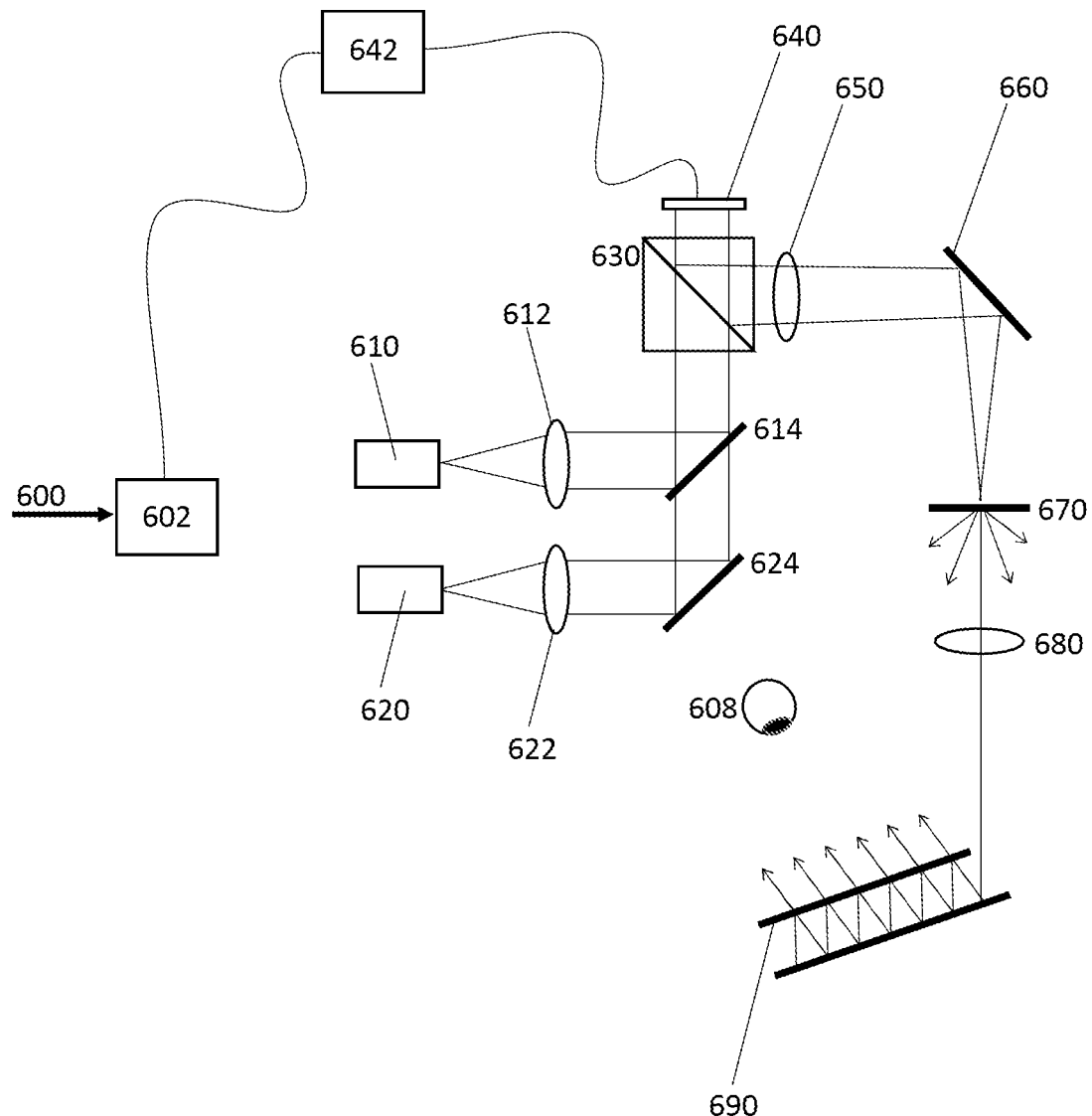
FIG. 6 shows a holographic display device in an indirect view configuration comprising a pupil expander in accordance with embodiments.

FIG. 6 shows a holographic display device comprising a waveguide forming a waveguide pupil expander in accordance with first example embodiments of the present disclosure.

Holographic display device comprises a picture generating unit arranged to form a first picture (also called "first image") and a second picture (also called "second image"). A first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). As described below, in other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

Holographic display device further comprises a holographic controller 602 arranged to control the picture generating unit, specifically the light output by picture generating unit as described herein. First spatially modulated light of the first colour corresponding to the first picture is output by SLM 640 to form a first single colour image (e.g. red image) on a light receiving surface 670, such as a screen or diffuser. A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction on the light receiving surface 670 which is positioned at the replay plane. Similarly, second spatially modulated light of the second colour corresponding to the second picture is output by SLM 640 to form a second single colour image (e.g. green image) on the light receiving surface 670. A second single colour computer-generated hologram is encoded on SLM 640 by holographic controller 602. The SLM 640 displays the second hologram and is illuminated by light of the second colour from the second colour/display channel to form a second holographic reconstruction on the light receiving surface at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second picture is formed on the light receiving surface 670. The first/second pictures are first/second holographic reconstructions of the respective first/second holograms. Thus, a composite colour picture may be formed on light receiving surface 670 combining the first and second pictures. A projection lens 680 is arranged to project the first and second pictures formed on the light receiving surface 672 to an input port of a pupil expander in the form of a waveguide 690. A viewer 608 may view a magnified image of the pictures from the expanded eye box—the "viewing window"-formed by waveguide 690 owing to optical power of projection lens 680. Waveguide 690 comprises an optically transparent medium separated by first and second reflective mirrors/surfaces as described herein. Thus, holographic display device has an "indirect view" configuration—that is the viewer 608 does not directly view the holographic reconstruction, but rather views pictures formed on light receiving surface 670.

Waveguide Geometry

Figure 7A:
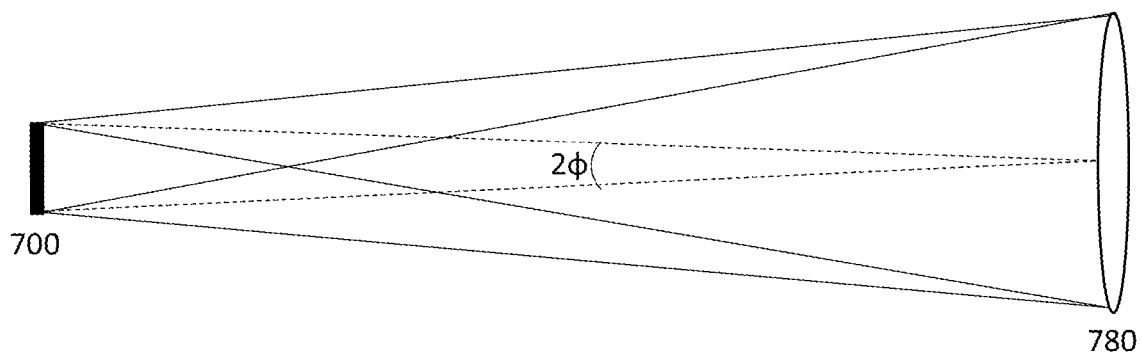
FIGS. 7A-C show the geometry of the pupil expander in accordance with embodiments.
Figure 7B:
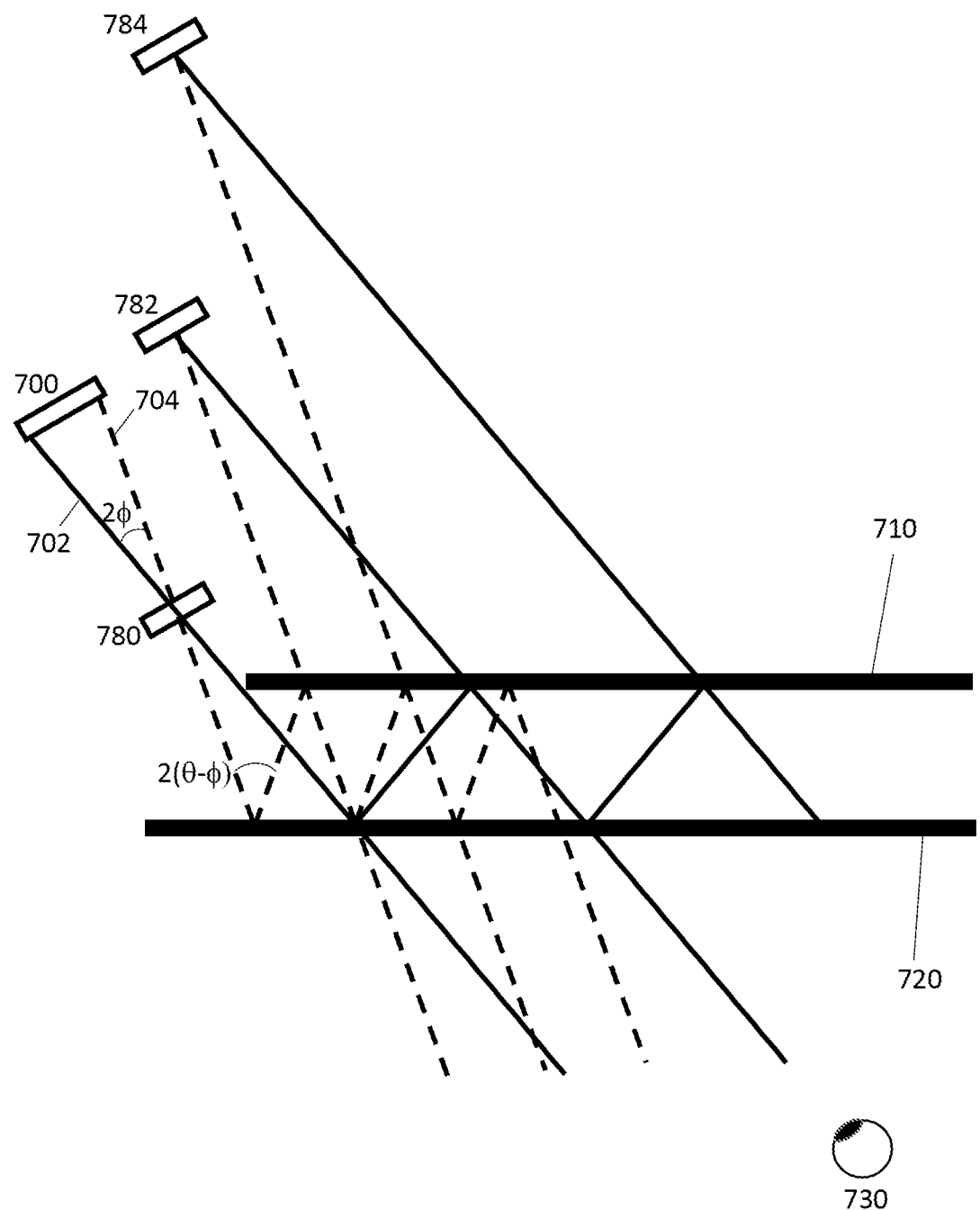
Figure 7C:
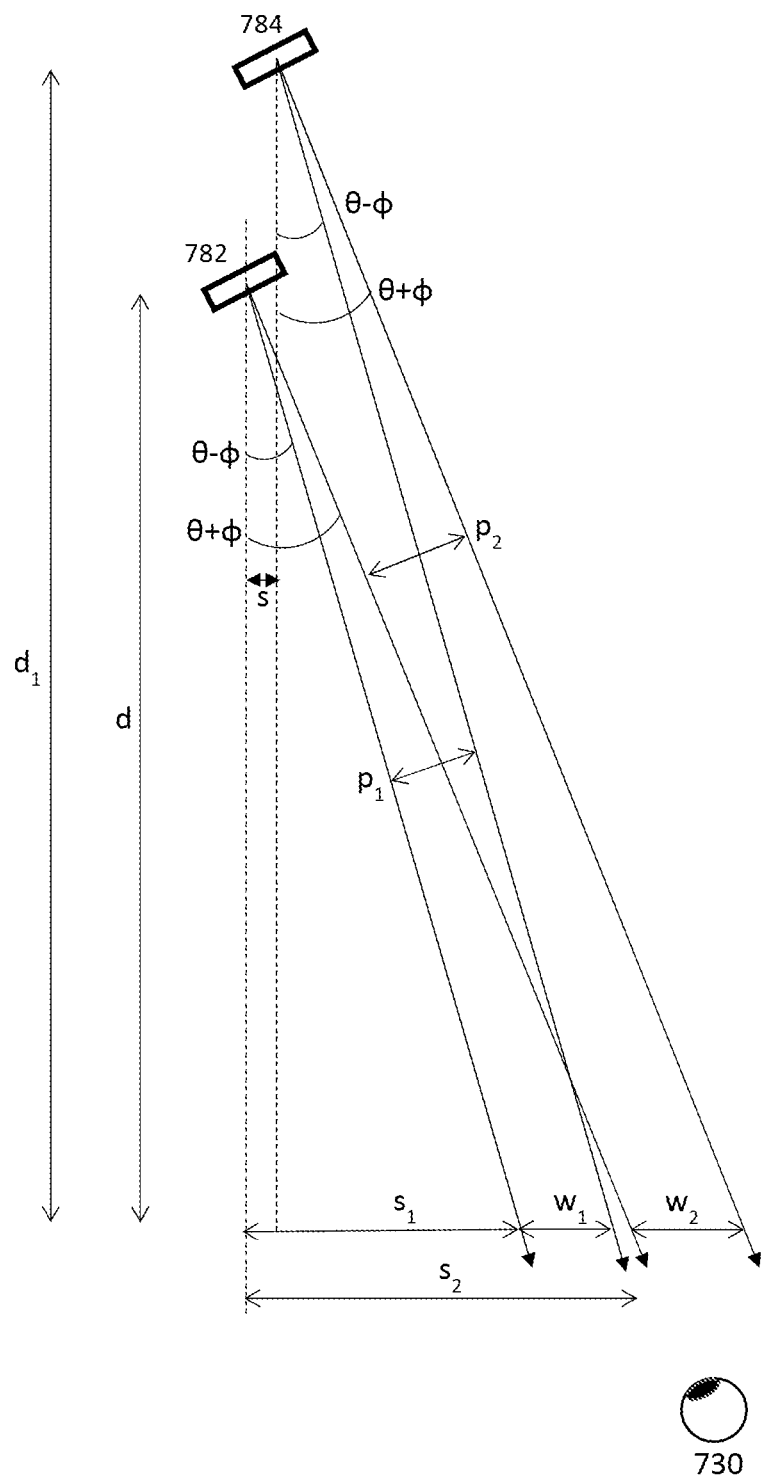

FIGS. 7A-C show the geometry of the waveguide pupil expander in accordance with embodiments. In particular, FIGS. 7B and 7C show the positioning, and propagation along waveguide, of the chief rays of an input image beam 702 (as a described above) and the output of replicas visible to viewer 730. Waveguide comprises first partially reflective surface 720 and second fully reflective surface 710 as described above.

The geometry shown in FIG. 7C may be represented by the following equations.

$$w_1 = 2d\tan(\theta - \phi) \quad (1)$$

$$w_2 = 2d\tan(\theta + \phi)$$

$$p_1 = 2d\sin(\theta - \phi)$$

$$p_2 = 2d\sin(\theta + \phi)$$

$$\tan(\theta - \phi) = s_1/d = (s_1 + w_1 - s)/d_1$$

$$\tan(\theta + \phi) = s_2/d = (s_2 + w_2 - s)/d_1$$

$$s_1 d_1 = (s_1 + w_1 - s)d$$

$$s_1 \Delta d = 2d^2\tan(\theta - \phi) - sd$$

$$s_2 d_1 = (s_2 + w_2 - s)d \quad (2)$$

$$s_2 \Delta d = 2d^2\tan(\theta + \phi) - sd$$

Subtract (1) from (2)

$$\Delta d = 2d^2(\tan(\theta + \phi) - \tan(\theta - \phi))/(s_2 - s_1)$$

Subtract $s_1(2)$ from $s_2(1)$ $$0 = 2s_2 d^2 \tan(\theta - \phi) - ss_2 d - 2s_1 d^2 \tan(\theta + \phi) - ss_1 d$$

$$s = (2s_2 d\tan(\theta - \phi) - 2s_1 d\tan(\theta + \phi))/(s_1 + s_2)$$

$$= (s_2 w_1 - s_1 w_2)/(s_1 + s_2)$$

Second Embodiments—Direct View Holographic Display Device

Figure 8:
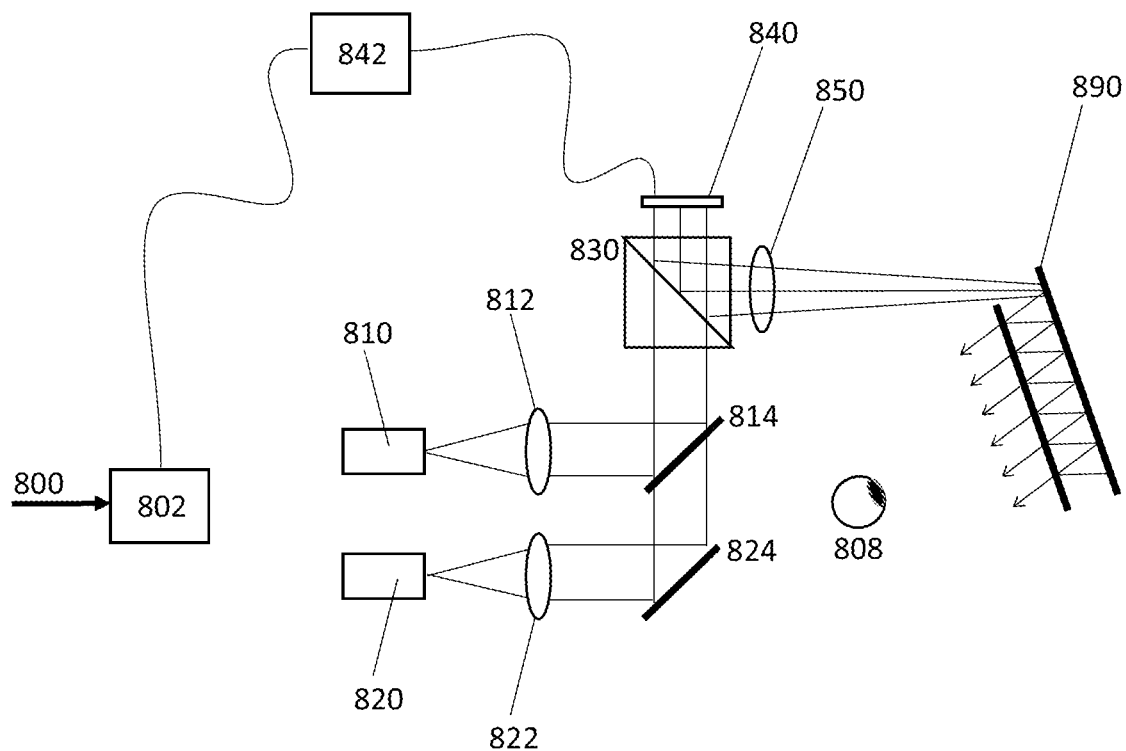
FIG. 8 shows a holographic display device in a direct view configuration comprising a pupil expander in accordance with embodiments.

FIG. 8 shows a holographic display device comprising waveguide pupil expander in accordance with second example embodiments of the present disclosure.

The holographic display device illustrated in FIG. 8 is similar to the holographic display device of FIG. 6. In particular, holographic display device comprises a picture generating unit arranged to form a first picture (or first image) and a second picture (or second image). A first single colour/display channel (e.g. red colour channel) comprises a first light source 810, a first collimating lens 812 and a first dichroic mirror 814 arranged to illuminate SLM 840 with light of the first wavelength. A second single colour/display channel (e.g. green colour channel) comprises a second light source 820, a second collimating lens 822 and a second mirror 824 arranged to illuminate the SLM 840 with light of the second wavelength. The first display channel is arranged to form the first image (e.g. red image). A first single colour computer-generated hologram is encoded on SLM 840 by a holographic controller 802. The SLM 840 displays the first hologram and is illuminated by light from the first colour channel to form a first holographic reconstruction at a replay plane. Similarly, the second display channel is arranged to form the second image (e.g. green image). A second single colour computer-generated hologram is encoded on SLM 840 by holographic controller 802. The SLM 840 displays the second hologram and is illuminated by light from the second colour channel to form a second holographic reconstruction at a replay plane.

The holographic display device further comprises a beam splitter cube 830, arranged to separate input light to and output light from SLM 840. However, in contrast FIG. 6, the holographic display device is a direct view system. In the illustrated arrangement, an optional lens 850 is positioned in the optical path of the spatially modulated light output by SLM 840, which determines the position of the replay plane along the optical path. A viewer 808 may directly view the spatially modulated light from the spatial light modulator. In some embodiments, as described above, the lens of the viewer's eye forms a holographic reconstruction on the retina of the eye. In these embodiments, it may be said that the viewer receives spatially modulated light encoded with the hologram. In other embodiments, the viewer receives light of the picture or light encoded with the picture. The picture may be formed at an intermediate plane in free space. Waveguide 890 comprises an optically transparent medium separated by first and second reflective surfaces as described above. Thus, holographic display device has an "direct view" configuration—that is the viewer looks directly at the display device (i.e. spatial light modulator) and no light receiving surface is used.

It should be noted that the holographic display devices of the embodiments illustrated in FIGS. 6 and 8 comprise picture generating units with two colour channels to form a colour picture (or image) by way of example only. The skilled person will appreciate that arrangements comprising a single colour channel to form a single colour picture (or image) or three or more colour channels to form full colour (polychromatic) images are equally possible.

Pupil Expander-Dual-Waveguide Configuration for 1D Pupil Expansion

The above described first and second embodiments of a holographic display device comprise a picture generating unit and a pupil expander that expands the exit pupil/ viewing window in one dimension. In accordance with the present disclosure, the pupil expander comprises a first waveguide pupil expander and a second waveguide pupil expander. The first and second waveguide pupil expanders are arranged in a composite configuration to reduce the volume occupied or required compared to a conventional single waveguide pupil expander that expands the exit pupil/viewing window in one dimension, for example as shown in FIG. 5.

Figure 9:
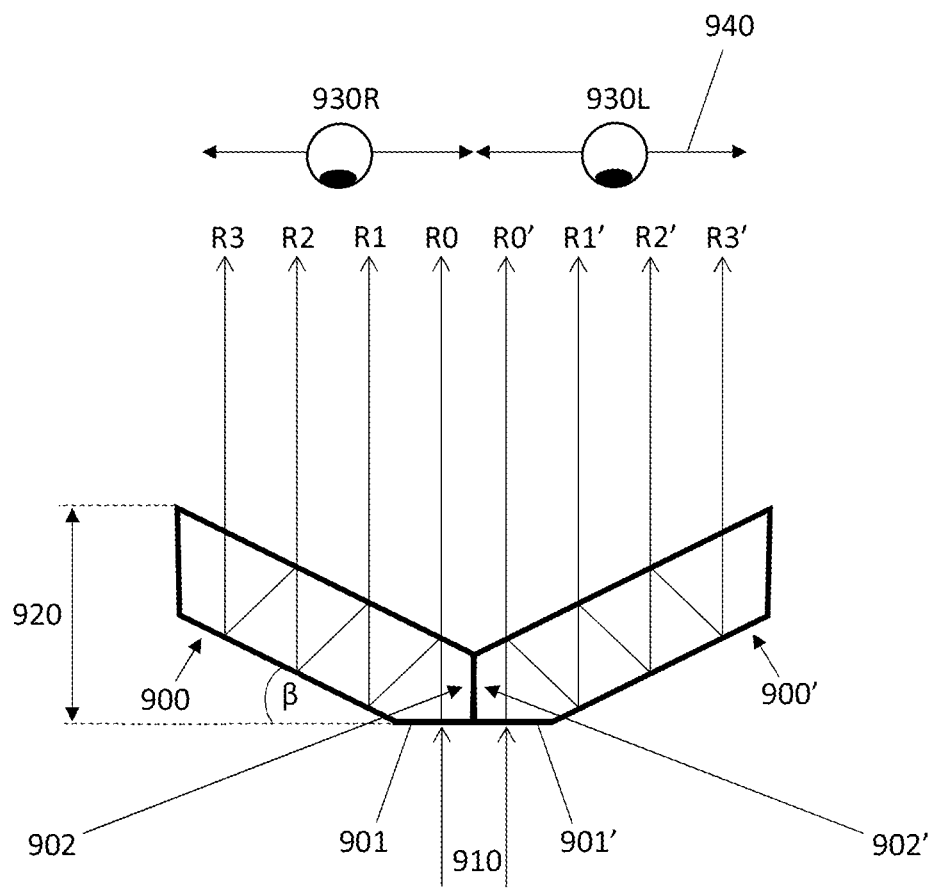
FIG. 9 shows a pupil expander in accordance with embodiments.

FIG. 9 shows an example pupil expander in accordance with embodiments of the present disclosure. In particular, the pupil expander is a "dual waveguide" arrangement comprising a first waveguide pupil expander 900 and a second waveguide pupil expander 900'. Each waveguide 900, 900' is approximately half the length of a single waveguide pupil expander for providing the desired amount of exit pupil expansion (e.g. number of replicas or distance). The first waveguide pupil expander 900 and the second waveguide pupil expander 900' are arranged symmetrically in a V-shaped configuration. In particular, first (proximal) ends of first and second waveguides 900, 900' are adjacent each of other and second (distal) ends of first and second waveguides 900, 900' are remote from each other. In addition, first and second waveguides 900, 900' are orientated symmetrically about the first proximal ends thereof. Thus, the first waveguide 900 is arranged at an (acute/non-orthogonal) angle θ relative to the plane of the viewing window in a first direction, and the second waveguide 900' is arranged at substantially the same (acute/non-orthogonal) angle θ to the plane of the viewing window in a second direction, opposite to the first direction, as shown in FIG. 9.

The first waveguide 900 comprises a first input surface 901 adjacent a first end thereof. In the illustrated arrangement, the first waveguide pupil expander 900 comprises a slab waveguide comprising an optically transparent solid material. Thus, first input surface 901 may be formed by grinding and/or polishing a side surface of the slab waveguide (e.g. the side surface opposite to the partially reflective surface forming the viewing surface) adjacent first end surface 902. First input surface 901 forms a first input port that is arranged to receive an input beam 910 comprising light of the picture (or image). The first waveguide 900 is arranged to guide the received light from the first input surface 901 in a first direction (towards the second (distal) end thereof) by a series of internal reflections, as described above with reference to FIGS. 4 and 5. In particular, the partially reflective surface of first waveguide pupil expander 900 is arranged to transmit replicas R0 to R3 of the received light of the picture (or image) along the length thereof in order to expand the exit pupil of the first waveguide pupil expander 900 in the first direction. It may be said that the first waveguide pupil expander 900 is arranged to expand the exit pupil (or viewing window) in the first direction of a first dimension (illustrated by the x-axis) of viewing plane 940 (e.g. width of viewing plane). The second waveguide 900' comprises a second input surface 901' at a first end thereof. Second input surface 901' may be provided in the same way as first input surface 901 as described above. Second input surface 901' of second waveguide 900' is adjacent the first input surface 901 of first waveguide 900. Thus, second input surface 901' forms a second input port that is also arranged to receive the input beam 910 comprising light of the picture (or image). The second waveguide 900' is arranged to guide the received light from the second input surface 901' in a second direction (towards a second end thereof), which is opposite the first direction, by a series of internal reflections, as described above with reference to FIGS. 4 and 5. In particular, the partially reflective surface of second waveguide pupil expander 900' is arranged to transmit replicas R0' to R3' of the received light of the picture (or image) in order to expand the exit pupil of the second waveguide pupil expander 900' in the second direction. It may be said that the second waveguide pupil expander 900' is arranged to expand the exit pupil (or viewing window) in the second direction of the first dimension (illustrated by the x-axis) of viewing plane 940.

Similar to the single waveguide pupil expander of FIG. 5, the dual waveguide pupil expander of FIG. 9 is arranged to maintain the direction of the optical/projection axis. Thus, the output light rays of the replicas R0 to R3 and R0' to R3' are in the same direction as the input light beam 910. Accordingly, the optical/projection axis of the input and output light is in a second dimension (illustrated as the y-axis/direction) orthogonal to the first dimension of the viewing plane 940.

In the illustrated arrangement, first end surface 902 of first waveguide pupil expander 900 is in abutment with first end surface 902' of second waveguide pupil expander 900'. Thus, first input surface 901 of first waveguide pupil expander 900 adjoins second input surface 901' of second waveguide pupil expander 900' so as to form a continuous surface for receiving the input beam 910. Accordingly, when implemented in a display device, the continuous surface formed by first and second input surfaces 901, 901' is configured to face the display plane of a picture generating unit so as to receive the input beam 910.

As shown in FIG. 9, first waveguide 900 is orientated at an angle relative to the plane of the viewing window and light rays of replicas R0 to R3 are evenly spaced and transmitted parallel to each other. Second waveguide 900' is arranged symmetrically to first waveguide 900, and so is orientated at the acute angle relative to the plane of the viewing window, but in the opposite direction. Thus, each waveguide pupil expander 900, 900' has an overall height 920 in the second dimension (illustrated by y-axis), corresponding to the direction of light rays of replicas R0 to R3 and R0' to R3', respectively. For the avoidance of doubt, the orientation of the first and second waveguides 900, 900' refers to the orientation of the length (or longitudinal axis) of the respective waveguide.

As previously mentioned, in the illustrated arrangement, each of the first and second waveguide pupil expanders 900, 900' is approximately half the length of a single waveguide pupil expander for providing the same amount of pupil expansion (e.g. same number of replicas), as shown by the comparative example waveguide pupil expander 500 of FIG. 5. In particular, in the comparative example of FIG. 5, the pupil expander is arranged to form eight replicas by means of a single waveguide 500 with a first length and orientated at angle α. In the embodiments of FIG. 9, the pupil expander is also arranged to form eight replicas by means of a pair of waveguides 900,900', each with a second length and orientated at angle β. Thus, in the case α=β, the second length of each of the first and second pupil expanders 900, 900' may be half the first length of the single waveguide 500 to form four replicas each (R0 to R3 and R0' to R3'). Thus, in accordance with the present disclosure, the overall height 920 of the composite (dual waveguide) pupil expander comprising the first and second waveguide pupil expanders 900, 900' is reduced compared to a single waveguide pupil expander that provides the same amount of pupil expansion, such as the waveguide pupil expander 500 of FIG. 5. Thus, the volume occupied by the pupil expander is reduced.

Referring again to FIG. 9, it can be seen that first waveguide pupil expander 900 is arranged to form replicas R0 to R3, which expand the exit pupil thereof in the first dimension (illustrated by the x-axis) in a first sub-area of the viewing window corresponding to the viewer's right eye 930R. Similarly, second waveguide pupil expander 900' is arranged to form replicas R0' to R3', which expand the exit pupil thereof in the first dimension (illustrated by the x-axis) in a second sub-area of the viewing window corresponding to the viewer's left eye 930L. Thus the viewer is able to see the complete image with the right eye 930R from any position in the first-sub-area as shown by associated arrows, and/or the left eye 930L from any position within the second sub-area as shown by associated arrows, where the first and second sub-areas are on the viewing plane 940 at the viewing distance. Thus, the viewing window at the viewing plane is formed by both the first and second sub-areas extending in the first dimension (illustrated by the x-axis). It may be said that the composite (dual waveguide) pupil expander of FIG. 9 forms a dual monocular system, in contrast to the single pupil expander of FIG. 5 which forms a binocular system. In particular, in the composite arrangement of FIG. 9, each of the first and second waveguides forms replicas that are seen (exclusively) by only one eye of the viewer—as in a monocular system.

As the skilled person will appreciate, the arrangement shown in FIG. 9 is just one example of possible forms and/or configurations of the first and second waveguide pupil expanders in accordance with the present disclosure. The first and second waveguides may be arranged in a complementary configuration (e.g. symmetrical about ends thereof), in which each waveguide extends lengthwise along the (expanded) first dimension of the viewing window. The first and second waveguides may have substantially the same length in order to provide a similar amount of pupil expansion. Equally, the first and second waveguides may have different lengths. In either case, the length of each of the first and second waveguides is reduced compared to the length of a comparable single waveguide providing the same amount of pupil expansion in one dimension (i.e. forming the same number of replicas).

Some embodiments may comprise first and second waveguide pupil expanders formed by pairs of mirrors, as in the example waveguide of FIG. 4. In such embodiments, the first ends of the first and second waveguides may be spatially separated to provide respective input ports for the input beam. Alternatively, the input ports may be formed in the second ends of the first and second waveguides. In such arrangements, suitable optics may be required to direct light from the display plane of the picture generating unit into the respective input ports of the first and second waveguides.

In further embodiments, first and second waveguide pupil expanders formed by respective slab waveguides may be arranged in different configurations to provide the required pupil expansion. For example, the input ports of the first and second waveguide pupil expanders may be located at opposite ends thereof. In such arrangements, each waveguide will be orientated at the required angle to provide internal reflection and light propagation through the waveguide.

Head-Up Display

Commercially-viable displays for the automotive industry are proposed by the applications using dynamic spatial light modulators including phase-only spatial light modulators. The main advantages of phase-only modulation are light efficiency and fault tolerance.

The physical extent of the replay field is limited by the maximum diffraction angle, $\theta_m$, of the SLM. Associated with each point in the replay field is a pencil of rays, which diverges with angle, $\phi$, and of which the chief ray also diverges. In Fourier holographic replay, the angle, $\phi$, gives the field of view (FOV) of the reconstruction. A small FOV is a correlate of a large replay field size. The angle of the chief rays is determined by the curvature of the replay field. A projection optic (e.g. lens or powered mirror) is used to view a virtual image of the replay field at a large distance (e.g. 2 m, 5 m, 15 m, etc). The combiner is typically the windscreen of the car. If the chief ray from each ray pencil is projected back, they will meet at a distance from the lens, u, determined by the curvature of the replay field surface. The eye pupil placed at a distance, v, from the projection lens, where v is given by the lens equation, will view the complete image. The FOV is now the total field subtended at the eye pupil.

In addition to viewing the complete image, it is essential that the driver be able to move his/her head around within a limited area at the designed distance, v. In the automotive industry, this is known as the eye motion box (EMB)—but referred to more generically herein as the viewing window. In order to be able to keep looking at the complete image as the eye moves around the EMB, the waveguide pupil expander is employed. The pupil expander enlarges the EMB due to the generation of extra rays by division of amplitude of the incident wavefront. The extra rays augment the visual field directly below the eye. A further consequence is that a larger image size can be supported and, hence, a larger FOV.

The applicant has fabricated slab waveguides based on glass, and slabs with an air cavity to function as the pupil expander. The uniformity of the expansion can be tailored using either graded reflectors or tailored diffraction gratings on the surface of the slab or in the bulk. Alternative technologies may be used for the pupil expander. For example, microlens arrays that result in a virtual image location which is close behind the expander. The main virtue of a HUD including the display device of the present disclosure is the reduction of eye focus correction between the virtual image and the road viewed by the driver.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, only the primary replay field is utilised and system comprises physical blocks, such as baffles, arranged to restrict the propagation of the higher order replay fields through the system.

In the above described embodiments, the holographic reconstruction is a composite colour image. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3-because each single-colour illumination event can only occur for one third of the frame time. This drawback could potentially be addressed by overdriving the lasers, or by using more powerful lasers, but this requires more power resulting in higher costs and an increase in the size of the system.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of expanding an eye-box in a viewing window at a viewing plane of a head-up display used by a viewer, the method comprising:
receiving, by a first waveguide pupil expander, first spatially modulated light encoded with a hologram at an input port so that the first waveguide pupil expander replicates the first spatially modulated light encoded with the hologram in order to expand an exit pupil in a first direction of a first dimension;

receiving, by a second waveguide expander, second spatially modulated light encoded with the hologram at an input port so that the second waveguide pupil expander replicates the spatially modulated light encoded with the hologram in order to expand the exit pupil in second direction of the first dimension, propagating the replicated first spatially modulated light encoded with the hologram from the first waveguide pupil expander to the viewing plane; and propagating the replicated second spatially modulated light encoded with the hologram from the second waveguide pupil expander to the viewing plane;

wherein the first dimension corresponds to a dimension of the eye-box, and wherein the first waveguide pupil expander and the second waveguide pupil expander are tilted with respect to the viewing plane of the eye-box in opposite directions, wherein the first waveguide pupil expander and the second waveguide pupil expander are abutted against one another or together form a single unitary structure, and wherein replicated first spatially modulated light encoded with the hologram and the replicated second spatially modulated light encoded with the hologram form a continuous viewing window at the viewing plane as a result of the expansion of the exit pupils of the first and second waveguide pupil expanders in the first direction.

2. The method as claimed in claim 1, wherein the first spatially modulated light encoded with the hologram is transformed to an image corresponding to the hologram at the viewing plane by an eye of the viewer, or the second spatially modulated light encoded with the hologram is transformed to an image corresponding to the hologram at the viewing plane by an eye of the viewer.

3. The method as claimed in claim 1 wherein the first waveguide pupil expander is angled in a direction of propagation of the replicated first spatially modulated light encoded with the hologram at the viewing plane and the second waveguide pupil expander is angled in a direction of propagation of the replicated second spatially modulated light encoded with the hologram in a direction of propagation of the replicated spatially modulated light at the viewing plane, to form a substantially V-shaped configuration with respect to the viewing plane.

4. The method as claimed in claim 1, wherein each of the first and second waveguide pupil expanders comprises a pair of parallel reflective surfaces arranged to guide the spatially modulated light from their input port by internal reflection.

5. The method as claimed in claim 4, wherein in each of the first and second waveguide pupil expanders the pair of parallel reflective surfaces comprises a pair of parallel reflective surfaces of an optically transparent solid material or a pair of parallel mirrors separated by an air gap.

6. The method as claimed in claim 1, wherein the input port of the first waveguide pupil expander and input port of the second waveguide pupil expander are substantially adjacent.

7. The method as claimed in claim 1, wherein the input port the first waveguide pupil expander is spatially separated from the input port of the second waveguide pupil expander.

8. The method as claimed in claim 1, wherein replicas of the spatially modulated light are evenly-spaced and propagate in parallel.

9. The method as claimed in claim 1, wherein the hologram is a hologram of a picture.

10. A head up display system for use by a viewer at viewing window of the head up display system, the viewing window being disposed at a viewing plane of the head up display system, the head-up display system comprising:

a source of first spatially modulated light and second spatially modulated light encoded with a hologram;

a first waveguide pupil expander having an input port configured to receive the first spatially modulated light encoded with the hologram from the source thereof, the first waveguide pupil expander being configured to replicate the first spatially modulated light encoded with the first hologram in order to expand an exit pupil thereof in a first direction of a first dimension;

a second waveguide pupil expander having an input port configured to receive the second spatially modulated light encoded with the hologram from the source thereof, the second waveguide pupil expander being configured to replicate the second spatially modulated light encoded with the hologram in order to expand an exit pupil thereof in a second direction of the first dimension the first waveguide pupil expander, the first waveguide pupil expander and the second waveguide pupil expander being tilted with respect to the viewing plane in opposite directions;

wherein the first waveguide pupil expander and the second waveguide pupil expander are abutted against one another or together form a single unitary structure, wherein the head up display system is configured to propagate the replicated first spatially modulated light encoded with the first hologram from the first waveguide pupil expander to the viewing plane and to propagate the replicated spatially modulated light encoded with the second hologram from the second waveguide pupil expander to the viewing plane, and wherein the first and second waveguide pupil expanders are configured such that the replicated first spatially modulated light encoded with the hologram and the replicated second spatially modulated light encoded with the hologram form a continuous viewing window at the viewing plane as a result of the expansion of the exit pupils of the first and second waveguide pupil expanders in the first direction.

11. The head-up display system as claimed in claim 10, configured such that the first spatially modulated light encoded with the hologram is transformed to an image corresponding to the hologram at the viewing window by an eye of the viewer, or the second spatially modulated light encoded with the hologram is transformed to an image corresponding to the hologram at the viewing window by an eye of the viewer.

* * * * *